United States Patent
Duluk, Jr. et al.

(10) Patent No.: US 9,830,210 B2
(45) Date of Patent: Nov. 28, 2017

(54) CPU-TO-GPU AND GPU-TO-GPU ATOMICS

(71) Applicant: NVIDIA CORPORATION, Santa Clara, CA (US)

(72) Inventors: Jerome F. Duluk, Jr., Palo Alto, CA (US); John Mashey, Portola Valley, CA (US); Mark Hairgrove, San Jose, CA (US); James Leroy Deming, Madison, AL (US); Cameron Buschardt, Round Rock, TX (US); Brian Fahs, Los Angeles, CA (US)

(73) Assignee: NVIDIA Corporation, Santa Clara, CA (US)

( * ) Notice: Subject to any disclaimer, the term of this patent is extended or adjusted under 35 U.S.C. 154(b) by 397 days.

(21) Appl. No.: 14/011,671

(22) Filed: Aug. 27, 2013

(65) Prior Publication Data
US 2014/0267334 A1    Sep. 18, 2014

Related U.S. Application Data

(60) Provisional application No. 61/800,004, filed on Mar. 15, 2013.

(51) Int. Cl.
| | | |
|---|---|---|
| G06F 12/02 | (2006.01) | |
| G06F 11/07 | (2006.01) | |
| G06T 1/60 | (2006.01) | |
| G06T 1/20 | (2006.01) | |

(52) U.S. Cl.
CPC ........ *G06F 11/073* (2013.01); *G06F 11/0751* (2013.01); *G06T 1/20* (2013.01); *G06T 1/60* (2013.01)

(58) Field of Classification Search
CPC .. G06F 9/467; G06F 12/0815; G06F 12/0831; G06F 12/0808; G06F 11/073; G06F 11/0736; G06F 12/1009–12/1018; G06T 1/20; G06T 1/60
See application file for complete search history.

(56) References Cited

U.S. PATENT DOCUMENTS

| | | | | |
|---|---|---|---|---|
| 6,496,909 B1 * | 12/2002 | Schimmel | ............... | G06F 12/10 |
| | | | | 710/200 |
| 6,804,729 B2 * | 10/2004 | Swanberg | ........................ | 710/22 |
| 8,788,794 B2 * | 7/2014 | Serebrin et al. | ............... | 712/216 |
| 8,799,583 B2 * | 8/2014 | Farrell et al. | .................. | 711/141 |

* cited by examiner

*Primary Examiner* — Charles Tseng
(74) *Attorney, Agent, or Firm* — Artegis Law Group, LLP

(57) ABSTRACT

One embodiment of the present invention includes techniques for a first processing unit to perform an atomic operation on a memory page shared with a second processing unit. The memory page is associated with a page table entry corresponding to the first processing unit. Before executing the atomic operation, an MMU included in the first processing unit evaluates an atomic permission bit that is included in the page table entry. If the MMU determines that the atomic permission bit is inactive, then the two processing units coordinate to change the permission status of the memory page. As part of the status change, the atomic permission bit in the page table entry is activated. Subsequently, the first processing unit performs the atomic operation uninterrupted by the second processing unit. Advantageously, coordinating the processing unit via the atomic permission bit ensures the proper and efficient execution of the atomic operation.

22 Claims, 6 Drawing Sheets

CPU-TO-GPU AND GPU-TO-GPU ATOMICS

CROSS-REFERENCE TO RELATED APPLICATIONS

This application claims benefit of the U.S. Provisional Patent Application Ser. No. 61/800,004, filed on Mar. 15, 2013, which is hereby incorporated herein by reference.

BACKGROUND OF THE INVENTION

Field of the Invention

The present invention generally relates to computer science and, more specifically, to techniques for CPU-to-GPU and GPU-to-GPU atomic operations.

Description of the Related Art

A typical computer system includes a central processing unit (CPU) and one or more parallel processing units (GPUs). Some advanced computer systems implement a unified virtual memory architecture common to both the CPU and the GPUs. Among other things, the architecture enables the CPU and the GPUs to access a physical memory location using a common (e.g., the same) virtual memory address, regardless of whether the physical memory location is within system memory or memory local to the GPU.

During execution of a software application, memory pages that are shared between processing units may receive simultaneous access requests. To ensure deterministic results when operating on data that is shared between processes, many software algorithms employ atomic operations. If atomic operations are supported, then the computer system ensures that an atomic operation to a memory location is not interrupted by other operations to the memory location. For instance, suppose that a read-modify-write atomic operation to a memory location were to be performed. In such a scenario, the computer system would typically prevent other accesses to the memory location while the process executing the atomic operation would read a value from the memory location, modify the value, and write the modified value to the memory location.

If not handled appropriately, atomic operations to a shared memory page may result in unexpected or unintended results. For instance, suppose that a particular memory location were to specify a value of 10. Further, suppose that a CPU and a GPU were to perform an increment atomic operation on the memory location in parallel. If the GPU and CPU are permitted to simultaneously access the memory page, then the resulting memory location could be updated to a value of 11 instead of the desired value of 12.

In one approach to supporting atomic operations in a computer system, atomic operations are handled on a localized basis. Typically, multiple cores in the CPU may execute atomic operations and specialized hardware included in the CPU will ensure the integrity of the results. Further, each GPU includes functionality to mediate atomic operations within that particular GPU. One limitation to this approach is that the indivisibility of such ostensibly atomic operations is not assured across a computer system. Notably, the atomicity of an "atomic" operation initiated by a particular GPU is preserved with respect to the particular GPU, but is not ensured with respect to the CPU or any other GPUs. Consequently, atomic operations such as read-modify-write may not execute correctly across computer systems where data may be accessed by multiple processing units.

In another approach to the above problem, if a particular processing unit attempts to perform an atomic operation on a memory page, then a computer system asserts a lock signal on a bus, such as the PCIe bus. This lock ensures that other processing units do not have access to the memory page during the atomic operation. One limitation to this approach is that such a lock on the bus prevents other bus processes from occurring while the particular processing unit performs the atomic operation. This leads to inefficiencies in system operation and therefore undermines overall system performance.

As the foregoing illustrates, what is needed in the art is a more effective approach to managing atomic operations in a system that implements a unified memory architecture.

SUMMARY OF THE INVENTION

One embodiment of the present invention sets forth a method for performing an atomic operation on a memory page shared by at least two processing units. The method includes receiving a request from a first processing unit to perform an atomic operation on the memory page, determining that an atomic permission bit in a first page table entry included in a first page table associated with the first processing unit is inactive, activating the atomic permission bit, and performing the atomic operation on the memory page while denying memory write and atomic accesses to the memory page by any processing unit except the first processing unit.

One advantage of the disclosed approach is that a computer system may correctly and efficiently perform atomic operations across multiple processing units. In particular, computer systems that implement a unified virtual memory architecture common to both the CPU and the GPUs may ensure the atomicity of atomic operations on memory that is shared between processing units. Further, this approach does not incur the system performance degradation associated with potential approaches such as asserting a lock signal on a bus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
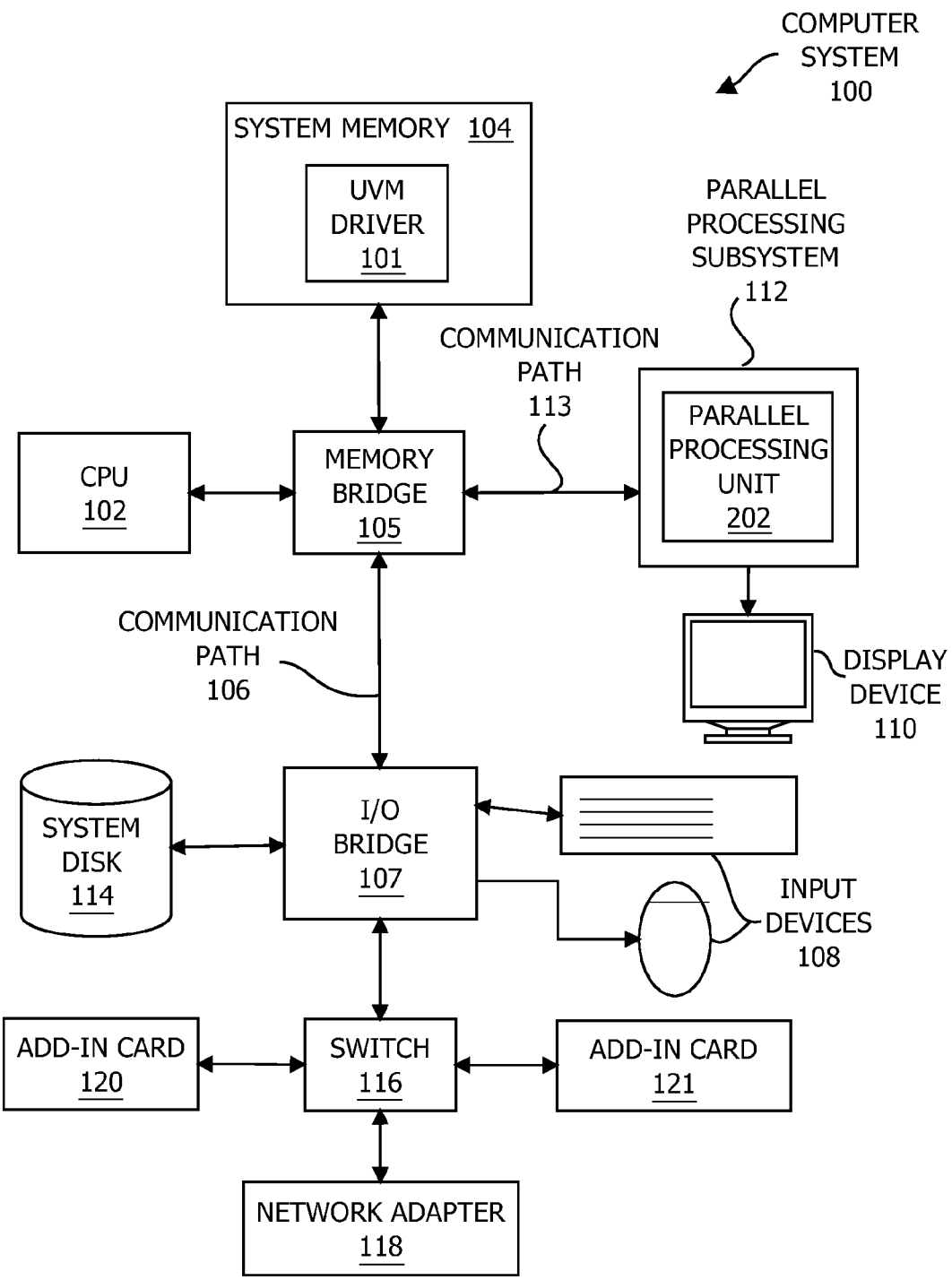
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202. Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
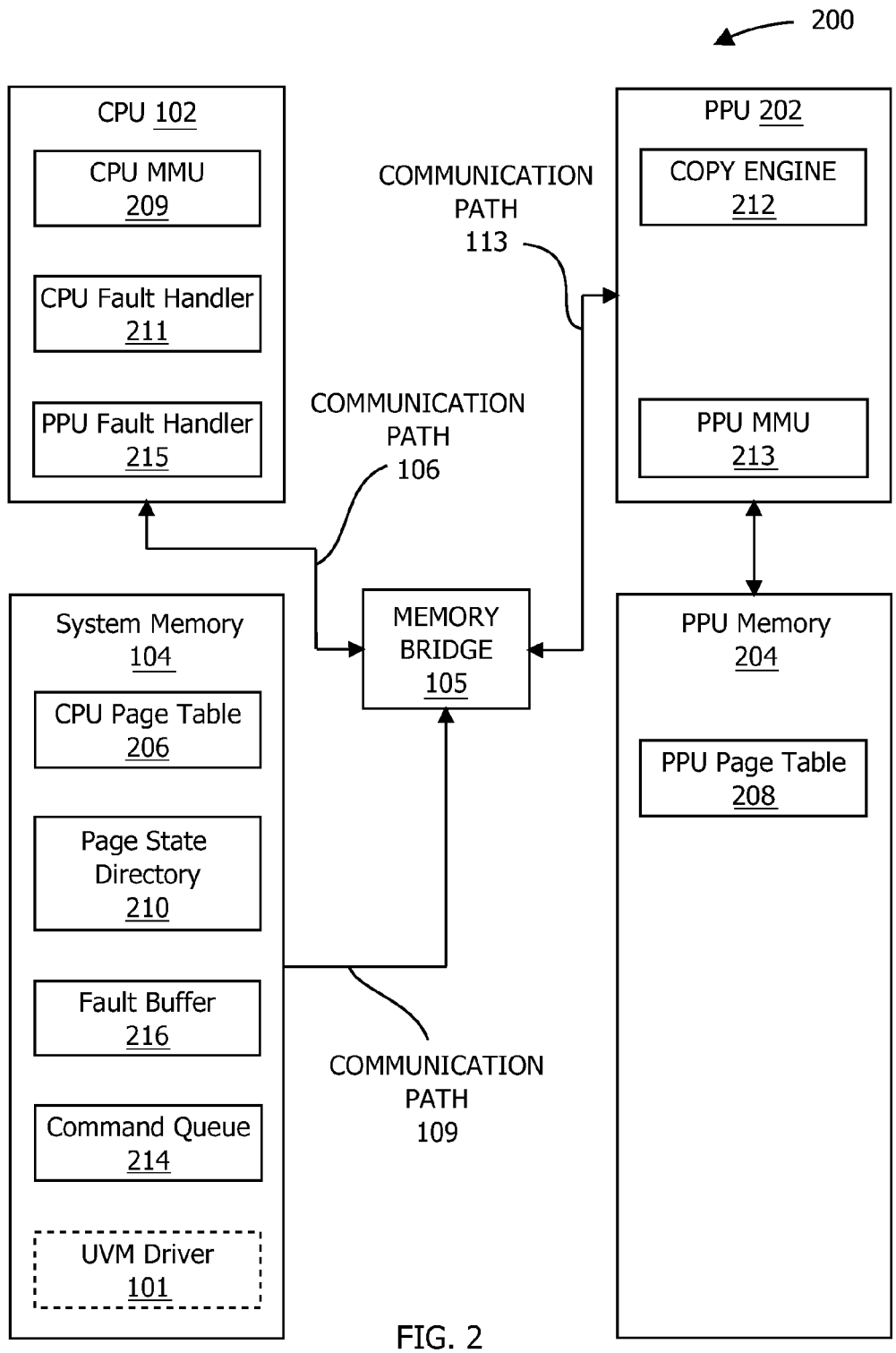
FIG. 2 is a block diagram illustrating a unified virtual memory system (UVM), according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault. In alternative embodiments, any combination of the page state directory 210, the fault buffer 216, and one or more command queues 214 may be stored in the PPU memory 204. Further, a PPU page table 208 may be stored in the system memory 104.

In a similar manner as with the CPU 102, the PPU 202 executes instructions that may request data stored in the system memory 104 or the PPU memory 204 via a virtual memory address. The PPU 202 includes a PPU MMU 213, which processes requests from the PPU 202 for translating virtual memory addresses to physical memory addresses. The PPU 202 also includes a copy engine 212, which executes commands stored in the command queue 214 for copying memory pages, modifying data in the PPU page table 208, and other commands. A PPU fault handler 215 executes steps in response to a page fault on the PPU 202. The PPU fault handler 215 can be software running on a processor or dedicated microcontroller in the PPU 202, or the PPU fault handler 215 can be software running on the CPU 102, with the latter being the preferred choice. In some embodiments, the CPU fault handler 211 and the PPU fault handler 215 can be a unified software program that is invoked by a fault on either the CPU 102 or the PPU 202. The command queue 214 may be in either the PPU memory 204 or the system memory 104, but is preferentially located in the system memory 104.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and memory swizzling type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address or the type of memory access is not permitted, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address. In some embodiments, a memory page may also be "PPU-shared," meaning that the memory page is stored in the PPU memory 204 and both the CPU 102 and the PPU 202 can access the memory page via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:

(a) on the CPU 102 access to an unmapped page that is mapped to the PPU 202, that has not been recently migrated, unmap the faulting page from the PPU 202, migrate the page to the CPU 102, and map the page to the CPU 102;

(b) on the PPU 202 access to an unmapped page that is mapped to the CPU 102, that has not been recently migrated, unmap the faulting page from the CPU 102, migrate the page to the PPU 202, and map the page to the PPU 202;

(c) on the CPU 102 access to an unmapped page that is mapped to the PPU 202, that has been recently migrated, migrate the faulting page to the CPU 102 and map the page on both the CPU 102 and the PPU 202;

(d) on the PPU 102 access to an unmapped page that is mapped on the CPU 102, that has been recently migrated, map the page to both the CPU 102 and the PPU 202;

(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;

(f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;

(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.

(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap and migrate the faulting page from the PPU 202, plus additional pages that are adjacent to the faulting page in the virtual address space, to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap and migrate the faulting page from the CPU 102, plus additional pages that are adjacent to the faulting page in the virtual address space, to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap and migrate the faulting page from the PPU 202, plus additional pages that are adjacent to the faulting page in the virtual address space, to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap and migrate the faulting page from the CPU 102, plus additional pages that are adjacent to the faulting page in the virtual address space, to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap and migrate the faulting page from the second PPU 202(2), plus additional pages that are adjacent to the faulting page in the virtual address space, to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 generally runs on the CPU 102, and performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared, the CPU 102 is the faulting unit. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to GPU visible," (CPU-shared). This state indicates that the page is currently in the process of being transitioned to CPU-shared. The PPU 202 updates the PPU page table 208 to associate the virtual address with the memory page. The PPU 202 also invalidates the TLB cache entries. Next, the PPU 202 changes the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

Overview of Atomic Operations

As described above with reference to FIG. 2, the UVM system 200 has shared memory pages, for example, CPU-shared memory pages. The PPU 202 is configured to perform atomic operations, which is a valuable operation for both the PPU 202 as well as the broader UVM system 200. An atomic operation is an operation during which a processing unit can read a location and write it back without any another processing unit accessing the memory location in-between the read and the write. However, in some ownership states of a memory page, the UVM system 200 needs to manage those atomic operations because multiple processing units have access to one memory page. One such ownership state is a CPU-shared ownership of a memory page where the PPU 202 and the CPU 102 share a memory page that is stored in the system memory 104. Another such ownership state is a PPU-shared ownership of a memory page where two PPUs 202 share a memory page that is stored in a memory local to one of those PPUs 202. In short, if one processing unit begins an atomic operation on the shared memory page, then the other processing unit(s) having access to that same memory page should be prevented from interfering with that atomic operation. Therefore, the UVM system 200 needs a mechanism that allows the processing unit to run the atomic operation to completion (e.g., complete read and write operations) without the memory location involved in the atomic operations being accessed (e.g., read from or written to) by another processing unit. Notably, the UVM system 200 can handle the atomic operations on a page granularity. Advantageously, the approach outlined herein provides an effective way to ensure exclusive access to the shared memory page for the purpose of performing the atomic operations without interference from another processing unit.

Atomic Operations on Shared Memory Pages

Figure 3:
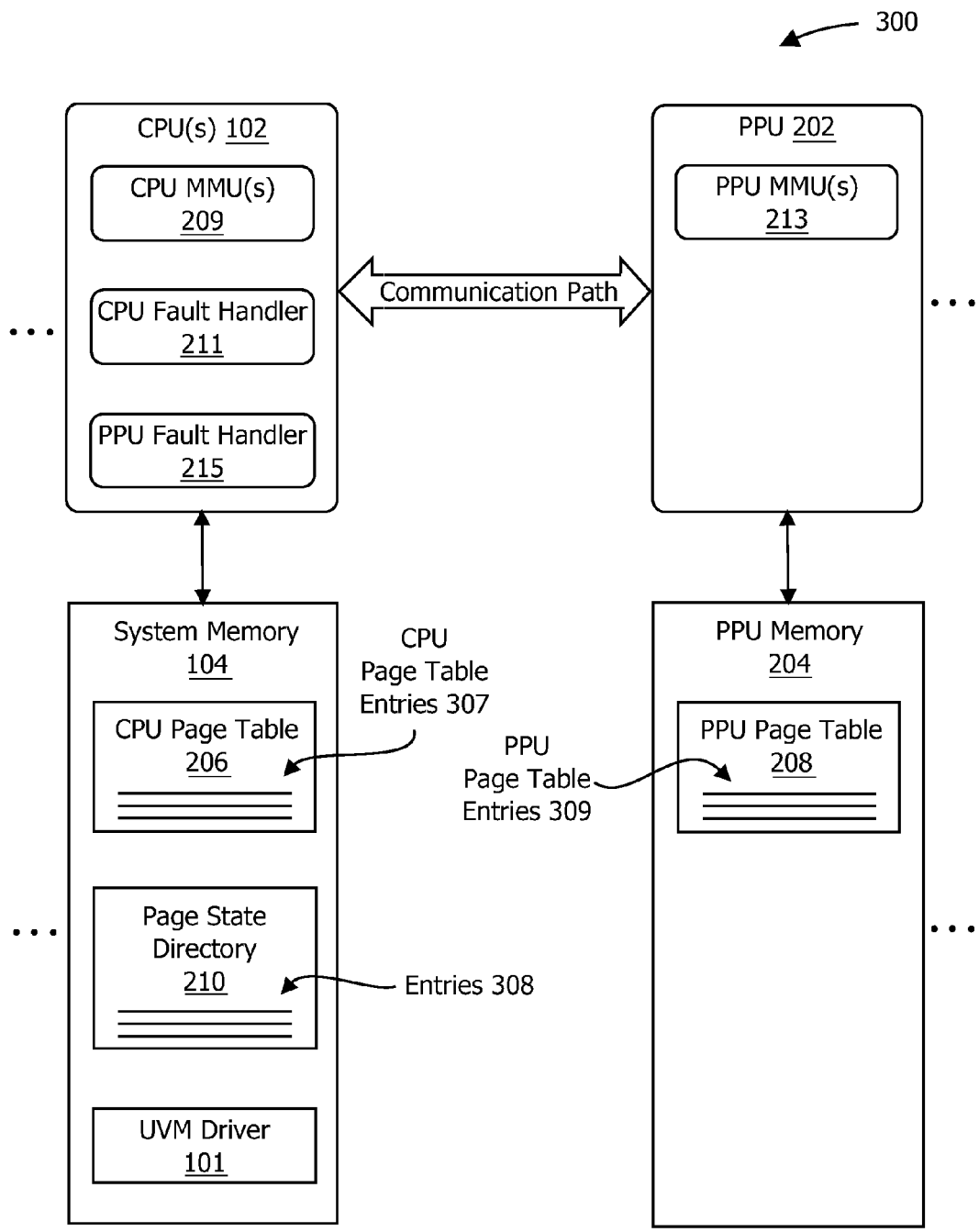
FIG. 3 is a block diagram illustrating a unified virtual memory (UVM) system, according to another embodiment of the present invention.

FIG. 3 is a block diagram illustrating a unified virtual memory (UVM) system 300, according to another embodiment of the present invention. The UVM system 300 is one implementation of the UVM system 200 of FIGS. 1 and 2, where like reference numerals have similar functionality. A functional addition in the UVM system 300 of FIG. 3 is the manner in which the UVM system 300 handles PPU page table entries 309 to enable/disable atomic operations on shared memory pages. Also shown are CPU page table entries 307 included in the CPU page table 206. The format of the CPU page table entries 307 may or may not match the format of the PPU page table entries 309. In addition, entries 308 are included in the page state directory (PSD) 210. Each entry 308 included in the PSD 210 may include flags (not shown). These flags enable the PSD 210 to keep track of states of memory pages in the overall UVM system 300, including memory pages stored in the system memory 104.

For explanatory purposes, the context of FIG. 3 is that the PPU 202 is performing atomic operations on one or more CPU-shared memory pages stored in the system memory 104 and jointly accessible by both the PPU 202 and the CPU 102. As an important note, however, the embodiment is not so limited. The approach is also applicable to PPU-shared memory pages where two PPUs 202 share one or more memory pages stored in the local memory of one of those PPUs 202 (e.g., peer-to-peer).

Figure 4:
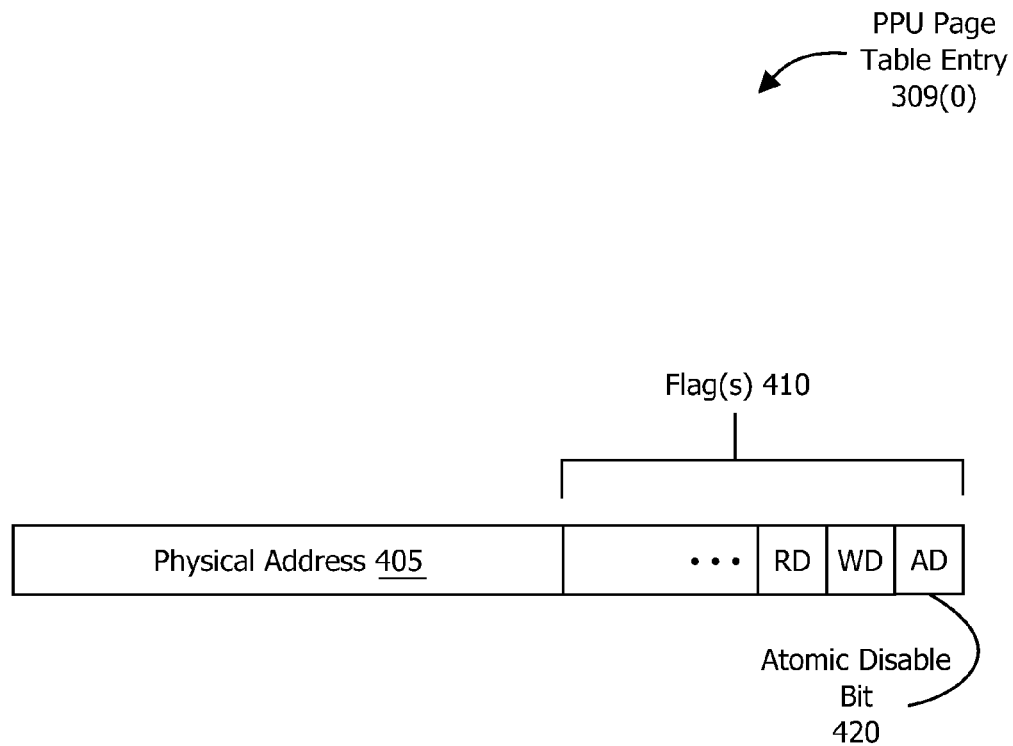
FIG. 4 is a conceptual diagram of the parallel processing unit (PPU) page table entry of FIG. 3, according to one embodiment of the present invention.

FIG. 4 is a conceptual diagram of the parallel processing unit (PPU) page table entry 309(0) of FIG. 3, according to one embodiment of the present invention. The page table entry 309(0) is one implementation of a page table entry 309 included in the PPU page table 208 of FIG. 3. To support atomic operations of the PPU 202 with respect to the CPU 102 and/or other PPUs 202 included in the UVM system 300 of FIG. 3, the PPU page table entry 309(0) includes flags 410. Notably, the flags 410 include an atomic disable bit (AD) 420 in addition to prior-art bits such as a read disable bit and a write disable bit. The PPU page table entry 309(0) also includes a physical address 405, which provides the location of a physical memory area.

In alternative embodiments, an atomic disable bit included in the entry 308 of the PSD 210 can be tested by the PPU MMU 213 when the PPU 202 initiates an atomic operation on the CPU-shared memory page. In some embodiments, the entry 308 included in the PSD 210 may include access information, such as a combined read/write/atomic access status. Further, the entry 308 may include an indication of the processor (CPU 102 or a PPU 202) that currently has atomic access. In some embodiments, the CPU page table entries 307 do not include an atomic disable bit. In such embodiments, if the CPU 102 has both read access and write access to a particular memory location, then the CPU 102 is considered to have atomic access to the memory location.

Referring back now to FIG. 3, the atomic disable bit 420 in a PPU page table entry (PPU PTE) 309 within the PPU page table 208 enables the PPU 202 to fault on an atomic operation. More specifically, such a fault may be triggered when the PPU 202 should, but does not, have temporary, exclusive access to the memory page corresponding to that PPU PTE 309, in order to perform an atomic operation on data stored within that memory page. If the atomic disable bit 420 included in the PPU PTE 309(0) is set (i.e., the value is binary "1", meaning atomic operations by the PPU 202 are disallowed), then the PPU 202 faults on an atomic operation attempt on the memory page corresponding to the PPU PTE 309(0). In response to this fault, the UVM system 300 prevents all other processing units in the UVM system 300 from issuing write or atomic accesses to the memory page corresponding to the PPU PTE 309(0). Further, the PPU fault handler 215 clears the atomic disable bit 420 (i.e., sets the value to binary '0') included in the PPU PTE 309(0). This response effectively grants the PPU 202 exclusive access to the memory page, possibly on a temporary basis. Only one PPU 202 at a time can have atomic operations enabled to a given memory page, and during that time neither any other PPU 202 nor the CPU 102 can have write or atomic access enabled to that memory page.

In operation, when the PPU 202 initiates an atomic operation on a particular CPU-shared memory page of the system memory 104, the PPU MMU 213 reads the atomic disable bit 420 included the PPU PTE 309. If the atomic disable bit 420 is set, then the resulting fault invokes the PPU fault handler 215. Among other things, the PPU fault handler 215 updates the CPU page table 206 to disable CPU 102 write and atomic accesses to the particular memory page. Further, the PPU fault handler 215 updates the PPU page tables 208 for other PPUs 202 to disable other PPU 202 write and atomic accesses to the particular memory page. In addition, the PPU fault handler 215 updates the appropriate entry 308 included in the PSD 210 to an updated state that indicates that the faulting PPU 202 has exclusive access to the particular memory page. In some embodiments, the updated state includes information indicating that the faulting PPU 202 is enabled for atomic operations on the particular memory page. Finally, the PPU fault handler 215 clears the atomic disable bit 420 (i.e., sets the value to binary '0') included in the PPU PTE 309 associated with the particular memory page.

In some embodiments, the UVM driver 101 is separate from the PPU fault handler 215, and is in charge of updating state of the PSD 210. In response to recognizing the need to update the state of the PSD 210, the UVM driver 101 removes all the CPU page table entries 307 that are associated with the particular CPU-shared memory page on which the PPU 202 is performing the atomic operation. Consequently, the CPU 102 cannot access the particular CPU-shared memory page. The UVM system 300 proceeds in the updated state. The PPU 202 performs the atomic operation on the particular CPU-shared memory page of the system memory 104. If there is any access attempt by the CPU 102 to the particular CPU-shared memory page, then a page fault is triggered. The CPU 102 page fault can result in the page being remapped back to the CPU 102, which would preferably happen after the PPU 202 completes its atomic operation. Prior to remapping a particular memory page back to the CPU 102, atomic operations are disabled in the PPU PTE 309 associated with the particular memory page.

In embodiments where multiple processing units share the memory page, the UVM driver 101 (or the PPU fault hander 215) disables access to the memory page by updating the PTEs in the local page tables associated with all processing units other than the processing unit performing the atomic operation. Advantageously, this allows the atomic operation to proceed and complete without interference.

After the PPU 202 atomic operation completes, if the CPU 102 attempts to access the memory page, then the UVM driver 101 (or the CPU fault handler 211) disallows further PPU 202 atomic operations. In particular, the UVM driver 101 or the CPU fault handler 211 sets the atomic disable bit 420 in the PPU page table entry 309. Further, the UVM driver 101 or the CPU fault handler 211 updates the PSD 210 to reflect the new access state of the memory page.

As noted above, the approach is also applicable where two or more PPUs 202 are sharing a PPU-shared memory page and one of those PPUs 202 requests to perform an atomic operation on that PPU-shared memory page.

In alternate embodiments, the atomic disable bit 420 may be implemented in any technically feasibly fashion. For example, the atomic disable bit 420 may be replaced with an atomic enable bit. In such an implementation, setting the atomic enable bit included in a PPU page table entry 309 would allow the corresponding PPU 202 to perform atomic operations.

PPU-Initiated Atomic Operation Method Overview

Figure 5A:
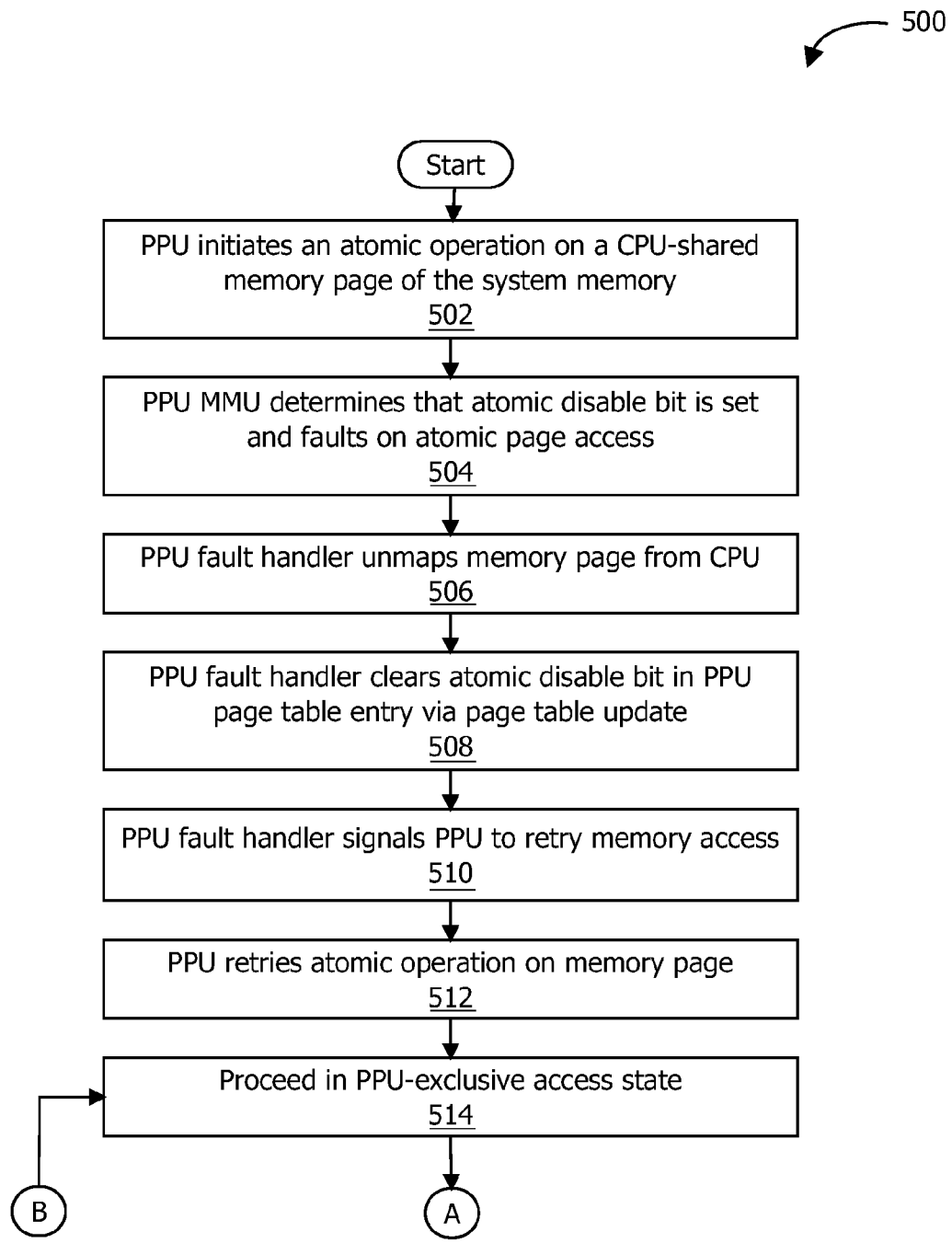
FIGS. 5A-5B set forth a flow diagram of method steps for performing an atomic operation on a memory page shared by a central processing unit (CPU) and a parallel processing unit (PPU), according to one embodiment of the present invention.
Figure 5B:
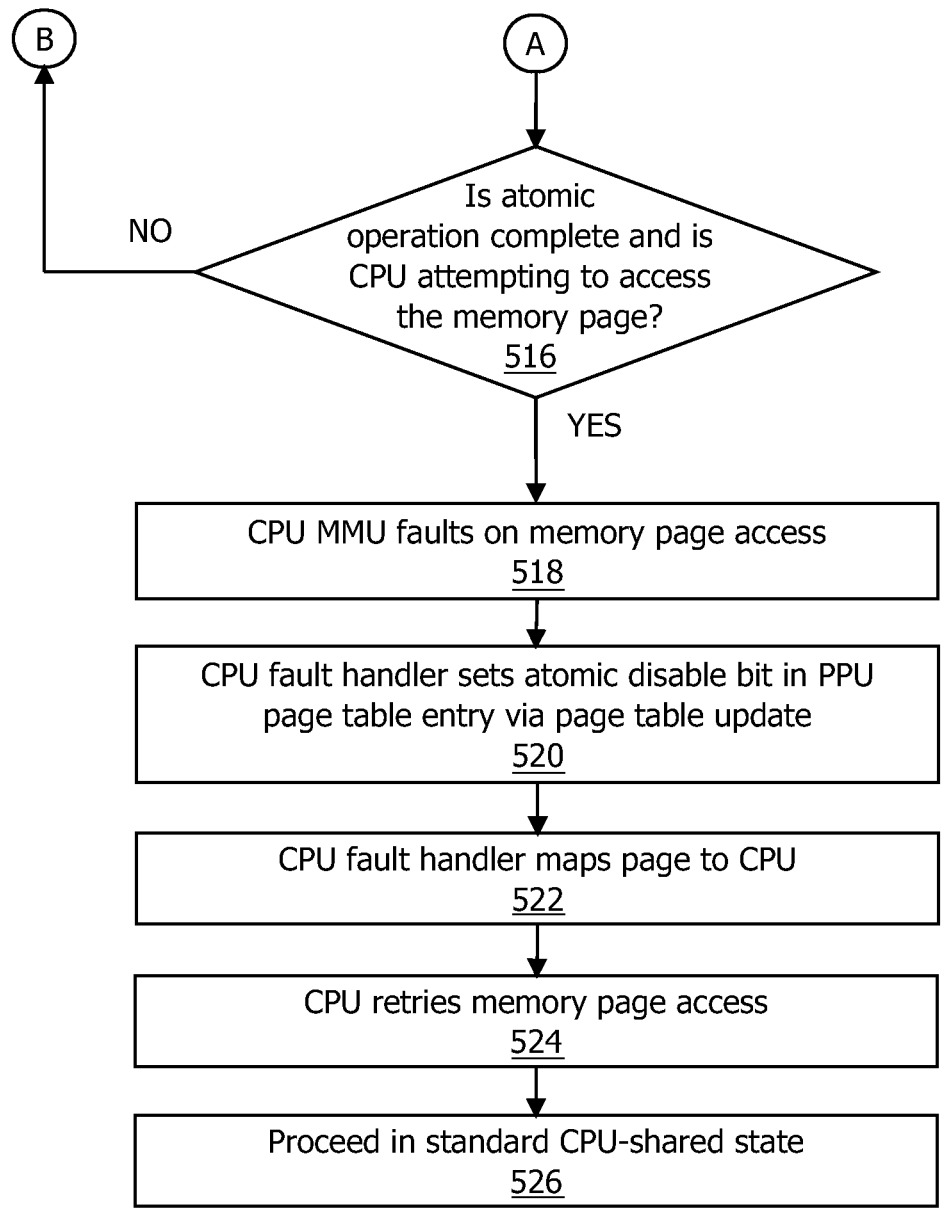

FIGS. 5A-5B set forth a flow diagram of method steps for performing an atomic operation on a memory page shared by a central processing unit (CPU) and a parallel processing unit (PPU), according to one embodiment of the present invention. Although the method steps are described herein in conjunction with the systems of FIGS. 1-4, persons skilled in the art will understand that any system configured to implement the method steps, in any order, falls within the scope of the present invention. For explanatory purposes, the context of the method 500 is a particular PPU (e.g., PPU 202) that is configured to perform an atomic operation on a CPU-shared memory page stored in the system memory 104. However, as persons skilled in the art will recognize, the techniques employed in method 500 are generally applicable to any processing unit that is configured to perform an atomic operation on a memory page of any other processing unit. For example, alternate embodiments of the invention disclosed herein include a PPU 202 that is configured to perform an atomic operation on another PPU 202 (e.g., peer-to-peer).

As shown, a method 500 begins at step 502, where the PPU 202 initiates an atomic operation on a CPU-shared memory page of the system memory 104. In particular, the PPU MMU 213 receives a request from the PPU 202 to perform an atomic operation on a CPU-shared memory page of the system memory 104. At step 504, the PPU MMU 213 accesses the atomic disable bit 420 in the PPU page table entry 309(0) that is associated with the CPU-shared memory page of the system memory 104. The PPU MMU 213 determines that the atomic disable bit 420 is set and consequently faults on the memory page access associated with the atomic operation.

At step 506, as part of handling the fault, the PPU fault handler 215 unmaps the memory page from the CPU 102. For instance, the PPU fault handler 215 may coordinate with other components configured by the UVM driver 101 to update the CPU page table 206. More specifically, components within the CPU 102 remove all the CPU PTEs 307 that are associated with the CPU-shared memory page on which the PPU 202 is performing the atomic operation. Further, components within the CPU 102 update the page state directory (PSD) 210 to reflect a state corresponding to a PPU-exclusive access of the memory page on which the PPU 202 is performing the atomic operation. For example, in one embodiment, the UVM driver 101 may include instruction to update an atomic disable bit of an entry of the PSD 210. After the memory page is unmapped from the CPU 102, any attempt by the CPU 102 to access the memory page will trigger a page fault. Advantageously, this fault handling mechanism enables the PPU 202 to perform the atomic operation without interruption from the CPU 102. At step 508, the PPU fault handler 215 issues a page table update that clears the atomic disable bit 420 in the PPU PTE 309(0).

At step 510 the PPU fault handler 215 issues a command that causes the PPU 202 to retry the memory access. At step 512 the PPU 202 retries the atomic operation on the memory page of the system memory 104. At step 514 the computer system 100 continues to operate with the memory page in a PPU-exclusive access state. If, at step 516, the computer system 100 determines that the PPU 202 has not completed the atomic operation or the CPU 102 is not attempting to access the memory page, then the method returns to step 514. The computer system 100 cycles through steps 514 through 516, continuing to operate with the memory page in a PPU-exclusive access state until the atomic operation is complete and the CPU 102 attempts to access the memory page.

At step 516, if the computer system 100 determines that the PPU 202 has completed the atomic operation and the CPU 102 is attempting to access the memory page, then the method proceeds to step 518. At step 518, the CPU 102 attempts to access the memory location associated with the PPU page table entry 309(0). Consequently, the CPU MMU 209 faults on the memory page access. At step 520, as part of handling the fault, the CPU fault handler 211 issues a page table update that sets the atomic disable bit 420 in the PPU page table entry 309(0). At step 522, the CPU fault handler 211 maps the memory page to the CPU 102 based on the data included in the PSD 210. Further, components within the CPU 102 update the PSD 210 to reflect the standard CPU-shared state of the memory page. At step 524 the CPU 102 retries the memory page access. At step 526 the computer system 100 continues to operate with the memory page in a standard CPU-shared state. After the atomic disable bit 420 in the PPU page table entry 309(0) is set, any attempt by the PPU 202 to access the memory page associated with the PPU page table entry 309(0) will trigger a fault.

The method 500 may include other actions and/or details that are not described in this method overview. For example, the PPU 202 may perform atomic operations on a PPU-shared memory page of another PPU 202 of the UVM system 300, instead of the CPU-shared memory page of the system memory 104. Other actions and/or details described herein may be a part of the method 500, depending on the implementation.

In sum, including an atomic enable/disable mechanism in PPU page table entries enables efficient support for atomic operations across the processing units included in a computer system. In particular, PPU atomic operations execute properly with respect to CPU memory accesses and other PPU memory accesses in computer systems that implement unified virtual memory architectures. At any given time, at most one processing unit has permission to perform atomic operations on a particular memory page. When a memory page is initially shared between the CPU and a particular PPU, the atomic disable bit included in the corresponding PPU page table entry is set. While the PPU atomic disable bit is set, the PPU is unable to perform atomic operations on the corresponding memory page. If the PPU attempts an atomic operation on the shared memory page, then a fault is triggered and UVM fault handing mechanisms update the state of the memory page to reflect a PPU-exclusive access state before allowing the atomic operation to proceed. As part of this update process, the PPU fault handler issues a page table update to clear the atomic disable bit included in the appropriate PPU page table entry. If the CPU attempts to access the memory page, then the UVM fault handling mechanism changes the state of the shared memory page to reflect different access permissions. Notably, the UVM fault handling mechanism issues a page table update to set the atomic disable bit included in the appropriate PPU page table entry, thereby trapping any subsequent PPU requests for atomic operations on that memory page.

Advantageously, the techniques disclosed herein ensure that atomic operations initiated by a PPU on a shared memory page are properly handled. More specifically, when a particular processing unit is performing an atomic operation on a shared memory page, the disclosed approach ensures that the atomic operation is executed without interference from any other processing units. Further, the integrity of atomic operations across processing units is assured without the performance degradation associated with prior-art techniques such as asserting a lock on the PCIe bus during PPU atomic operations.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for performing an atomic operation on a memory page shared by at least two processing units, the method comprising:
   receiving a request from a first processing unit to perform an atomic operation on the memory page, wherein the memory page corresponds to a first page table entry included in a first page table associated with the first processing unit, and the first page table entry includes an atomic permission bit;
   determining that the atomic permission bit in the first page table entry is inactive;
   removing all page table entries that are associated with the memory page from a second page table associated with a second processing unit;
   activating the atomic permission bit; and
   while the atomic permission bit is active, performing the atomic operation on the memory page while denying memory write and atomic accesses to the second processing unit.

2. The method of claim 1, further comprising generating a fault based on the value of the atomic permission bit.

3. The method of claim 2, wherein the first page table entry corresponds to a virtual address that is associated with the memory page.

4. The method of claim 3, further comprising updating a page state entry included in a page state directory to a state that reflects the activated atomic permission bit.

5. The method of claim 1, further comprising:
   determining that the atomic operation has completed and that another processor is attempting to access the memory page; and
   inactivating the atomic permission bit.

6. The method of claim 1, wherein activating the atomic permission bit provides the first processing unit with exclusive access to the memory page.

7. The method of claim 1, wherein the first processing unit comprises a parallel processing unit and, the second processing unit comprises a central processing unit.

8. The method of claim 1, wherein the first processing unit comprises a parallel processing unit, and the second processing unit comprises another parallel processing unit.

9. The method of claim 1, further comprising performing a write operation on the memory page while the atomic permission bit is inactive and the write permission bit is active.

10. A computer-implemented method for performing an atomic operation on a memory page shared by at least two processing units, the method comprising:
    receiving a request from a first processing unit to perform an atomic operation on the memory page;
    determining that an atomic permission bit in a first page table entry included in a first page table associated with the first processing unit is inactive, wherein the first page table entry corresponds to a virtual address that is associated with the memory page;

generating a fault based on the value of the atomic permission bit;

removing all page table entries that are associated with the memory page from a second page table associated with the second processing unit;

activating the atomic permission bit;

updating a page state entry included in a page state directory to a state that reflects the activated atomic permission bit; and performing the atomic operation on the memory page while denying memory write and atomic accesses to the memory page by any processing unit except the first processing unit.

11. A non-transitory computer-readable storage medium including instructions that, when executed by a processing unit, cause a first processing unit to perform an atomic operation on a memory page shared by at least two processing units, the method comprising:

receiving a request from a first processing unit to perform an atomic operation on the memory page, wherein the memory page corresponds to a first page table entry included in a first page table associated with the first processing unit, and the first page table entry includes an atomic permission bit;

determining that the atomic permission bit in the first page table entry is inactive;

removing all page table entries that are associated with the memory page from a second page table associated with a second processing unit;

activating the atomic permission bit; and while the atomic permission bit is active, performing the atomic operation on the memory page while denying memory accesses to the second processing unit.

12. The non-transitory computer-readable storage medium of claim 11, further comprising generating a fault based on the value of the atomic permission bit.

13. The non-transitory computer-readable storage medium of claim 12, wherein the first page table entry corresponds to a virtual address that is associated with the memory page.

14. The non-transitory computer-readable storage medium of claim 13, further comprising updating a page state entry included in a page state directory to a state that reflects the activated atomic permission bit.

15. The non-transitory computer-readable storage medium of claim 11, further comprising:

determining that the atomic operation has completed and that another processor is attempting to access the memory page; and inactivating the atomic permission bit.

16. The non-transitory computer-readable storage medium of claim 11, wherein activating the atomic permission bit provides the first processing unit with exclusive access to the memory page.

17. The non-transitory computer-readable storage medium of claim 11, wherein the first processing unit comprises a parallel processing unit and, the second processing unit comprises a central processing unit.

18. The non-transitory computer-readable storage medium of claim 11, wherein the first processing unit comprises a parallel processing unit, and the second processing unit comprises another parallel processing unit.

19. A system configured to perform an atomic operation on a memory page shared by at least two processing units, the system comprising:

a memory management unit configured to:

receive a request from a first processing unit to perform an atomic operation on the memory page, wherein the memory page corresponds to a first page table entry included in a first page table associated with the first processing unit, and the first page table entry includes an atomic permission bit and a write permission bit, access the atomic permission bit in the first page table entry, and cause all page table entries that are associated with the memory page to be removed from a second page table associated with a second processing unit; and the first processing unit configured to:

while the atomic permission bit is active, perform the atomic operation on the memory page while memory accesses are denied to a second processing unit.

20. The system of claim 19, wherein the memory management unit is further configured to generate a fault based on a value of the atomic permission bit.

21. A computer system comprising:

a first memory comprising a plurality of memory pages;

a second memory comprising a page table that includes a plurality of page table entries, wherein each page table entry comprises an atomic permission bit that is configured to allow read operations and write operations while disallowing atomic operations;

a memory management unit configured to:

receive a request from a first processor to perform an atomic operation on a first memory page included in the plurality of memory pages, access a first atomic permission bit in a first page table entry included in the page table, wherein the first atomic permission bit is associated with the first memory page, and cause all page table entries that are associated with the memory page to be removed from a second page table associated with a second processor; and the first processor configured to:

while the atomic permission bit is active, perform the atomic operation on the memory page while memory write and atomic accesses are denied to the second processor.

22. A computer-implemented method for performing an atomic operation on a memory page shared by at least two processing units, the method comprising:

receiving a request from a first processing unit to perform an atomic operation on the memory page, wherein the memory page corresponds to a first page table entry included in a first page table associated with the first processing unit, and the first page table entry includes an atomic permission bit;

determining that the atomic permission bit in the first page table entry is inactive;

based on determining that the atomic permission bit is inactive, updating a write permission bit included in a second page table entry to disable write access to the memory page by a second processing unit, wherein the second page table entry is included in a second page table associated with the second processing unit;

activating the atomic permission bit; and while the atomic permission bit is active, performing the atomic operation on the memory page while denying memory write and atomic accesses to the second processing unit.

* * * * *